Feb. 7, 1950     C. T. FULLER     2,496,708
RODENT TRAP
Filed Jan. 30, 1948     2 Sheets-Sheet 1
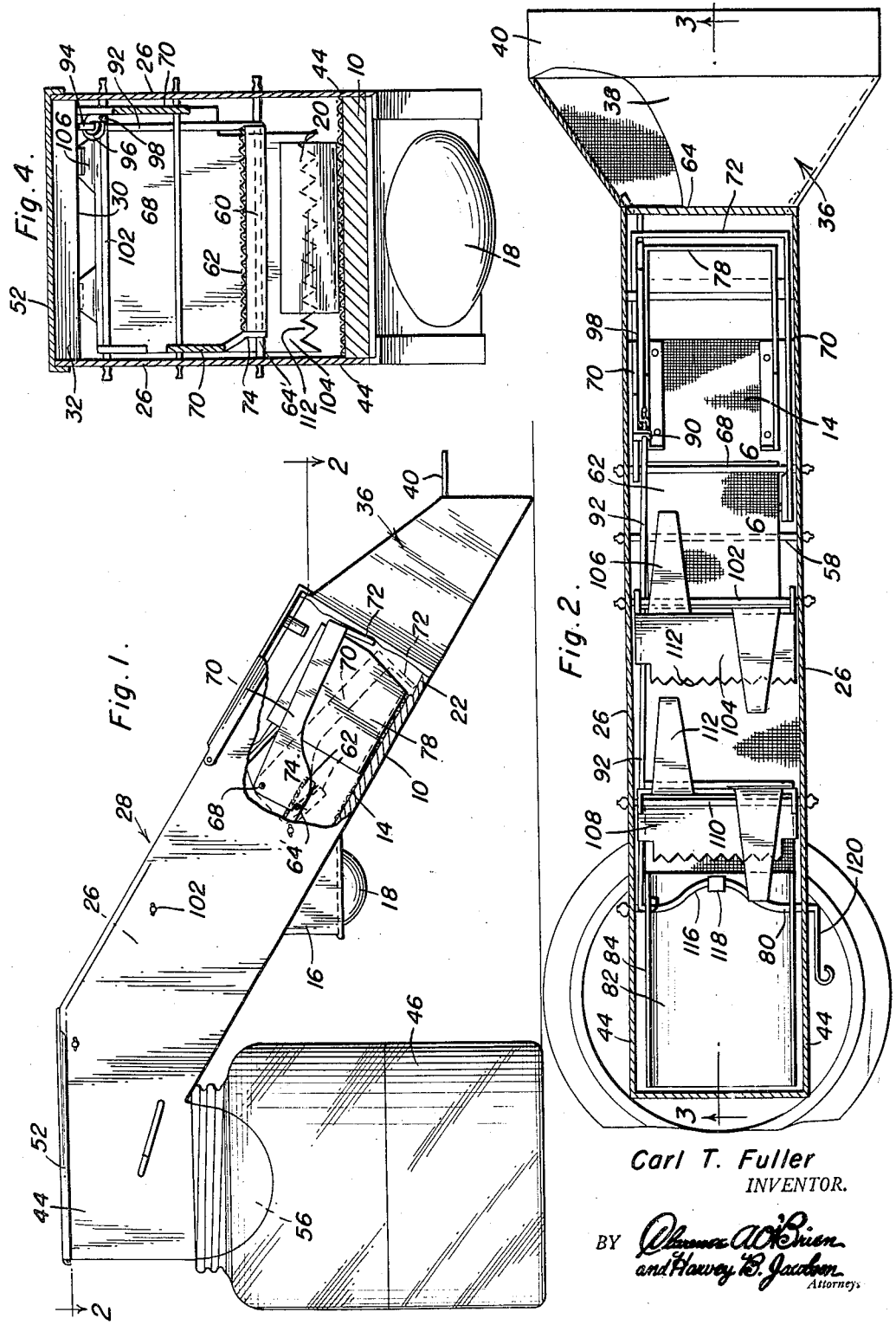
Carl T. Fuller
INVENTOR.
BY *Clarence A. O'Brien*
*and Harvey B. Jacobson*
Attorneys Feb. 7, 1950     C. T. FULLER     2,496,708
RODENT TRAP
Filed Jan. 30, 1948     2 Sheets-Sheet 2
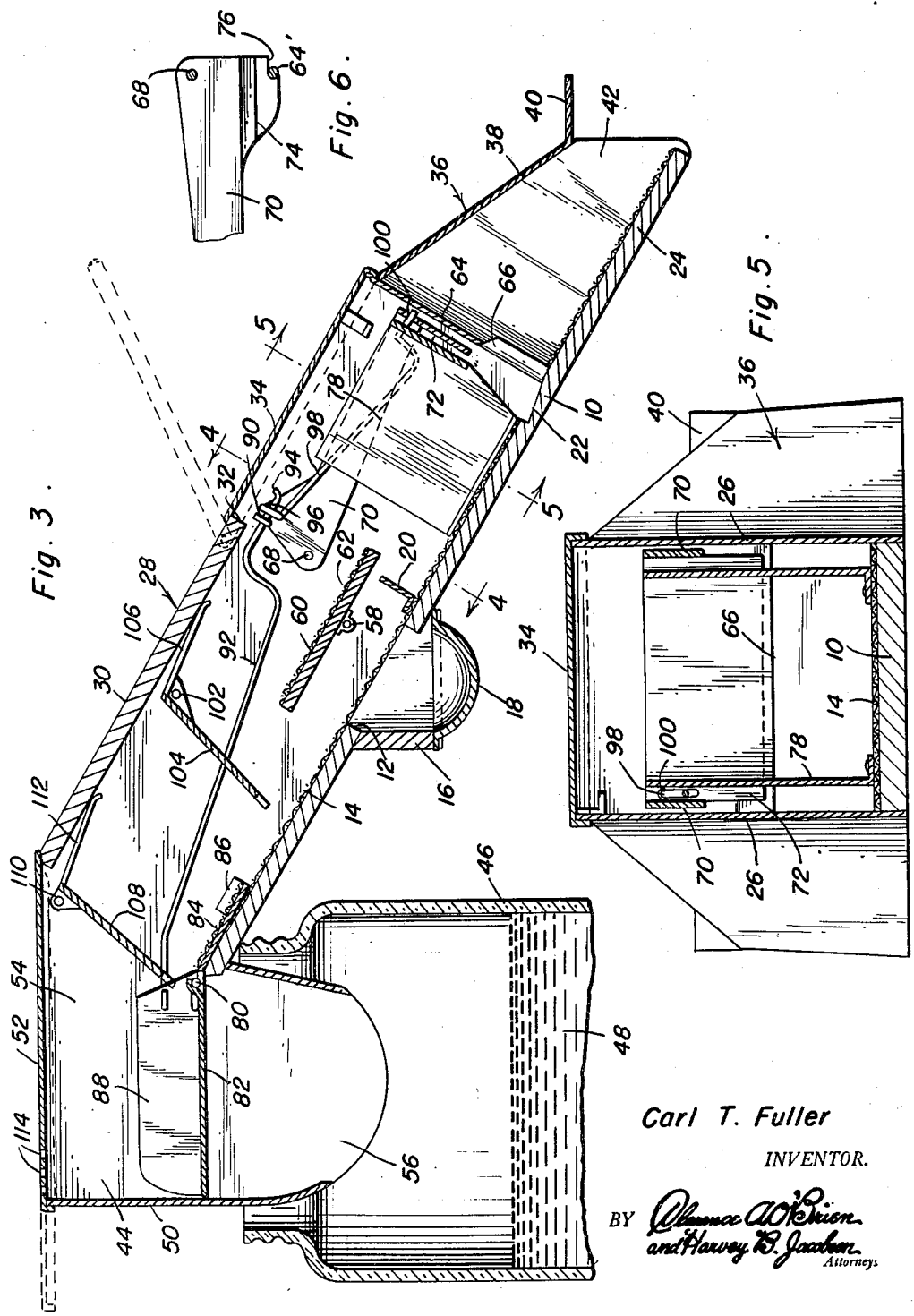
Carl T. Fuller
INVENTOR.

Patented Feb. 7, 1950

2,496,708

UNITED STATES PATENT OFFICE 2,496,708

RODENT TRAP

Carl T. Fuller, Billings, Mont.

Application January 30, 1948, Serial No. 5,385

2 Claims. (Cl. 43—67)

This invention relates to a rodent trap and has for its primary object to destroy rats, mice and similar pests.

Another object is to prevent the escape of a rodent once it has entered the trap and to protect the bait from consumption by a rodent in the trap.

A further object is to discharge a rodent from the trap into a body of liquid from which there is no escape so that the rodent will either drown therein or be otherwise disposed of.

In the drawings:

Figure 1 is a side view of a rodent trap embodying the features of this invention, showing certain portions of the near side wall broken away more clearly to illustrate certain details of construction;

Figure 2 is a sectional plan view taken substantially along the line 2—2 of Figure 1;

Figure 3 is a vertical sectional view taken substantially along the line 3—3 of Figure 2;

Figure 4 is a transverse sectional view taken substantially along the line 4—4 of Figure 3;

Figure 5 is a transverse sectional view taken substantially along the line 5—5 of Figure 3, and Figure 6 is an enlarged fragmentary detail view of the access door retaining latch.

Referring to the drawings in detail, this improved rodent trap comprises a ramp 10 of substantially elongated rectangular form, and formed intermediate the ends of the ramp is an opening 12 the purpose of which will be more fully hereinafter explained. The top surface of the ramp is provided with a suitable covering 14 of wire mesh or the like which extends over the opening 12 to prevent the rodents from entering a bait box 16 which is suspended from the underside of the ramp 10 and registers with the opening 12. This bait box is provided with a removable bottom 18 through which it may be charged with suitable bait by which the rodents are enticed to enter the trap. Extending upwardly from the upper side of the ramp 10 adjacent the lower end edge of the opening 12 is a stop 20, and formed in the upper face of the ramp between the stop 20 and its lowermost end edge is a transversely extending groove 22 to accommodate the lower edge of the access door to be more fully hereinafter described. The ramp 10 is flared adjacent its lower end to form an enlarged access platform 24 as will be readily understood upon reference to the drawings.

Attached to opposite side edges of the ramp 10 are the side walls 26 of an elongated hood or cover designated generally 28 which hood or cover cooperates with the ramp 10 in forming a substantially transversely rectangular tunnel. The top wall 30 of the cover 28 is provided adjacent its lower end with an access opening 32 adapted to be closed by a hinged cover 34, and enclosing the enlarged or flared portion 24 of the ramp 10 is an extension designated generally 36 of the hood 28, the top wall 38 of which is provided with an outwardly extending flange 40 which is adapted to hold the lower edges of the side walls 42 of the extension 36 in spaced relation to a wall of the building structure in which the trap is used. The side walls 26 of the hood 28 are provided with spaced parallel angular extensions 44 which project beyond the upper end of the ramp 10 and are adapted to overhang a container 46 for a suitable rodent destroying liquid 48 which may be water or the like. An end wall 50 extends across the ends of the side wall extensions 44 and cooperates with a removable cover 52 in forming a substantially horizontally extending chamber 54 adjacent the upper end of the tunnel 28, the bottom of which opens into a chute 56 which is adapted to extend downwardly into the neck of the receptacle 46 toward the surface of the liquid 48 therein so that a rodent passing beyond the upper end of the ramp 10 will be directed into the liquid 48.

Pivotally mounted as at 58 within the hood 28 and above the opening 12 in the ramp 10 is a treadle 60, the top surface of which is covered with a suitable wire mesh 62 corresponding in all respects to the wire mesh 14 covering the ramp 10, and extending laterally from the treadle 62 adjacent the end nearest the lower end of the ramp is a latch pin 64', the purpose of which will be more fully hereinafter explained. Extending across the end of the hood 28 adjacent the junction of the flared extension 24 with the ramp 10 is an end wall 64 which is provided adjacent its lower end with an access door opening or doorway 66 through which a rodent passing through the flared extension 36 of the hood 28 enters the hood 28. Pivotally supported as at 68 above the treadle 62, and adjacent opposite side walls 26 of the hood 28 are the supporting arms 70 of a door 72 which extends transversely across the hood 28 adjacent the end wall 66, in such a position that when the door 72 is in lowered position, the access doorway 66 will be closed. The arm 70 on one side of the door 72 is provided with a depending portion 74 having a notch 76 formed therein in which the latch pin 64' of the treadle 60 is received when the door is being held in open position. It will thus be seen that when pressure is applied to the lowermost edge of the treadle 60, the latch pin 64' will be moved downwardly to disengage the end wall of the notch 76 and permit the door 72 to drop into doorway closing position. A suitable shield 78 is mounted on the ramp 10 adjacent the door 7 to protect the door and arms 70 from interference by a rodent trapped within the hood 28.

Pivotally supported as at 80 adjacent the upper end of the ramp 10 and between the extensions 44 of the side walls 26 of the hood 28 is a trap door 82 which is provided with an angular extension 84 which overlies a portion of the upper end of the ramp 10 and carries a counterweight 86 by which the trap door is normally held in closed position as illustrated in Figure 3. As shown, this trap door 82 closes the upper end of the chute 56 and is provided along opposite side edges with upstanding flanges 88 which move through vertical arcs in parallel relation with the extensions 44 of the side walls 26.

Projecting inwardly from the arm 70 of the trap door 72 opposite that carrying the extension 74 is an ear 90, and slidably mounted through said ear is one end of a link 92, the opposite end of which is pivotally coupled to one of the flanges 88 of the trap door 82. The extreme end of the link 92 remote from that which is coupled to the flange 88 of the trap door 82 is equipped with an angularly extending stop member 94, and surrounding the portion of the link 92 between the ear 90 and the stop member 94 is a loop 96 which is formed at one end of a longitudinally movable latch bolt 98. The end of the latch bolt 98 remote from that carrying the loop 96 projects through an opening 100 formed in the access door 72 and is adapted when the door is in lowered position to engage the wall 64 of the access doorway 66 in order to prevent the door 72 from moving to open position until pull is exerted on the link 92. Pivotally mounted as at 102 intermediate the ends of the hood 28, and between the treadle 60 and the chamber 54 is a trap door 104 provided with an angular stop 106 which is adapted to engage the top 30 of the hood 28 to prevent swinging movement of the door 104 toward the treadle 62. A similar trap door 108 is pivotally supported as at 110 adjacent the junction of the hood 28 with the chamber 54 and like the door 104 is provided with a stop 112 which limits the swinging of the door beyond a predetermined point toward the door 104. In the preferred form of the invention, both doors 104 and 108 are equipped along the edges remote from their respective pivots with a row of teeth or sharpened prongs 112 which serve to discourage a rodent from attempting to lift the door once it has moved into the compartment defined thereby.

In use, bait is placed in the bait box 16 to rest on the bottom 18 thereof and the trap is set in such a position that the upper end thereof rests on the upper edge of the open mouth of a receptacle or jar 46. In the preferred form of the invention, the receptacle comprises a conventional one quart fruit canning jar. Should it be desired to set the trap adjacent the baseboard, the flange 40 will hold the entrance of the trap away from the wall a distance sufficient to permit a rodent to enter the trap. With the door 72 in elevated position and the trap door 82 closed, it will be evident that a rodent working its way up through the extension 36 of the enclosure 28 along the ramp 10 will pass through the doorway 66 in seeking the bait contained in the bait box 16. Stepping on the end of the treadle 60 nearest the doorway 66, the rodent will cause it to tilt, thereby moving the latch pin 64' out of engagement with the wall of the notch 76 and permitting the door 72 to drop by gravity to close the doorway 66 and prevent escape of the rodent. In the preferred form of the invention, the cover 52 of the chamber 54 is preferably pierced with spaced rows of closely spaced openings 114 to admit a certain amount of light to the chamber 54. The rodent in its effort to escape from the interior of the enclosure 28 will move upwardly past the doors 104 and 108, seeking the area lighted by the light passing through the openings 114 and will thus enter the chamber 54 with the doors 104 and 108 falling back into the position illustrated in Figure 3 to prevent the rodent from retracing its steps. Entering the chamber 54, the rodent will encounter the trap door 82 which tilting under the weight of the rodent and against the effort of the counterweight 86 will drop the rodent into the liquid 48 contained within the vessel 46. Simultaneously with the tilting of the trap door 82, pull will be exerted on the link 92, thereby moving the angular extension or finger 94 into engagement with the loop 96 of the bolt 98 so as to retract the bolt and sequentially exert pull on the upper end of the arm 70 carrying ear 90 to thereby return the door 72 to its elevated position where it is again latched by the latch finger 64' engaging the notch 76. Obviously, if so desired, the pivot shaft 80 may be provided intermediate its ends with a bow 116 and anchored to the trap door 82 as at 118. In such an instance, the shaft 80 is also projected through one of the side walls 26 and provided with a lever 120 by which the trap door may be rocked with the pivot shaft 80 to exert pull on the link 92 and latch bolt 98 to restore the access door 72 to open position. By reason of the engagement of the latch bolt 98 with the upper wall of the access doorway 66 when the door 72 is in closed position, it is evident that the door 72 will be held against upward movement until pull is exerted on the link 92 at which time the releasing of the latch bolt and the elevation of the door 72 takes place progressively and sequentially.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A rodent trap comprising an upwardly inclined ramp, a depending discharge chute at the upper end of the ramp, a bait box between the upper and lower ends of the ramp, an enclosure for the ramp and the discharge chute, said enclosure having a vertical wall formed with an access doorway adjacent the lower end of the ramp, a door adjacent the access doorway adapted to fall by gravity into doorway closing position, a treadle pivotally supported within the enclosure near the bait box, means carried by the treadle releasably to hold the door elevated above the access doorway until the treadle is moved under the weight of a rodent thereon, a trap door pivotally supported in the enclosure adjacent the discharge chute for movement under the weight of a rodent thereon, means actuated by the movement of the trap door under the weight of a rodent to restore the access door to elevated position, a latch bolt carried by the access door to engage the vertical wall of the doorway and hold the access door in closed position, and means operable by the access door restoring means to retract the latch bolt prior to exerting lifting effort on the access door.

2. A rodent trap comprising an upwardly inclined ramp, a depending discharge chute at the upper end of the ramp, a bait box between the upper and lower ends of the ramp, an enclosure for the ramp and the discharge chute, said enclosure having a vertical wall formed with an access doorway adjacent the lower end of the ramp, a door adjacent the access doorway adapted to fall by gravity into doorway closing position, a treadle pivotally supported within the enclosure near the bait box, means carried by the treadle releasably to hold the door elevated above the access doorway until the treadle is moved under the weight of a rodent thereon, a trap door pivotally supported in the enclosure adjacent the discharge chute for movement under the weight of a rodent thereon, a latch bolt carried by the access door for engaging the vertical wall of the doorway and holding said door in closed position, and means actuated upon downward movement of the trap door progressively and sequentially to retract the latch bolt and restore the access door to elevated position.

CARL T. FULLER.

REFERENCES CITED

The following references are of record in the file of this patent:

UNITED STATES PATENTS

| Number | Name | Date |
|---|---|---|
| 988,863 | Crabtree | Apr. 4, 1911 |
| 1,245,138 | Zarling | Oct. 30, 1917 |